United States Patent
Oshima et al.

(10) Patent No.: US 10,392,934 B2
(45) Date of Patent: Aug. 27, 2019

(54) METHOD AND APPARATUS FOR PROCESSING WAVEFORMS

(71) Applicant: Schlumberger Technology Corporation, Sugar Land, TX (US)

(72) Inventors: Atsushi Oshima, Tokyo (JP); Takeshi Endo, Kanagawa-ken (JP); Hiroaki Yamamoto, Kanagawa-Ken (JP); Naoki Sakiyama, Tokyo (JP); Hiroshi Nakajima, Kanagawa-ken (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 105 days.

(21) Appl. No.: 15/516,428

(22) PCT Filed: Nov. 10, 2015

(86) PCT No.: PCT/US2015/053975
§ 371 (c)(1),
(2) Date: Apr. 3, 2017

(87) PCT Pub. No.: WO2016/057384
PCT Pub. Date: Apr. 14, 2016

(65) Prior Publication Data
US 2017/0248015 A1    Aug. 31, 2017

(51) Int. Cl.
*G06F 11/30*  (2006.01)
*E21B 49/08*  (2006.01)
*G01V 1/48*  (2006.01)
*E21B 47/18*  (2012.01)
*E21B 47/12*  (2012.01)
(Continued)

(52) U.S. Cl.
CPC ............ *E21B 49/08* (2013.01); *E21B 47/124* (2013.01); *E21B 47/18* (2013.01); *G01V 1/48* (2013.01); *G01V 1/50* (2013.01); *E21B 47/04* (2013.01)

(58) Field of Classification Search
CPC ....................................................... E21B 49/08
See application file for complete search history.

(56) References Cited

U.S. PATENT DOCUMENTS 5,278,805 A    1/1994   Kimball
6,510,104 B1   1/2003   Ikegami
(Continued)

OTHER PUBLICATIONS

Kimball, Christopher,Shear Slowness Measurement by Dispersive Porcessing of the Borehole Flexural Mode, Geophysics, vol. 63, No. 2, Mar.-Apr. 1998, p. 337-344.
(Continued)

*Primary Examiner* — Phuong Huynh

(57) ABSTRACT

A technique facilitates slowness estimation in accordance with dispersion information in a sonic logging tool. The technique may be used for processing dispersive waveforms in real-time. In this embodiment, the technique utilizes a sonic transmitter and a sonic receiver array in the logging tool. The technique also includes use of a memory and a processor mounted in the logging tool, for converting dispersive waveforms into slowness of the formation and/or fluid in accordance with dispersion information stored in the memory. Additionally, the technique may utilize a telemetry system for sending the formation slowness data and/or quality control indicators to the surface.

17 Claims, 6 Drawing Sheets

(51) Int. Cl.
*G01V 1/50* (2006.01)
*E21B 47/04* (2012.01)

(56) References Cited

U.S. PATENT DOCUMENTS

| | | |
|---|---|---|
| 7,457,194 B2 | 11/2008 | Prioul et al. |
| 7,698,066 B2 * | 4/2010 | Huang .................. G01V 1/48 702/14 |
| 8,625,390 B2 | 1/2014 | Wang et al. |
| 2005/0190651 A1 | 9/2005 | Plona et al. |

OTHER PUBLICATIONS

Kimball et al., Error Bars for Sonic Slowness Measurements, Geophysics, vol. 63, No. 2, Mar.-Apr. 1998, p. 345-353.
International Search Report and Written Opinion issued in corresponding International Application PCT/US2015/053975 dated Dec. 21, 2015. 16 pages.

* cited by examiner

US 10,392,934 B2

METHOD AND APPARATUS FOR PROCESSING WAVEFORMS

RELATED APPLICATIONS

The present document is based on and claims priority to U.S. Provisional Application Ser. No. 62/059,158, filed Oct. 3, 2014, entitled "Method and Apparatus for Processing Dispersive Waveform while Drilling" to Atsushi Oshima, et al., which is incorporated herein by reference in its entirety.

BACKGROUND

The following descriptions and examples are not admitted to be prior art by virtue of their inclusion in this section.

The present disclosure generally relates to acoustic well logging, sometimes referred to as sonic well logging, and may include methods and systems for acoustic log data processing. The oil and gas industry uses various tools to probe formations penetrated by a borehole to locate hydrocarbon reservoirs and to determine the types and quantities of the hydrocarbons. Among these tools, acoustic tools have been found to provide valuable information regarding formation properties. In acoustic logging, a tool is lowered into a borehole and acoustic energy is transmitted from a source into the borehole and the formation. The acoustic waves that travel in the formation are then detected with an array of receivers.

Modern acoustic tools generally have multipole sonic sources. The multipole sources may include one or more monopoles, dipoles, and/or quadrupoles to excite different modes. Monopole mode excitation is traditionally used to generate compressional and shear head waves. From the monopole measurements, formation compressional and shear slowness can be obtained by processing the head wave components. However, in slow formations, which are defined as having a shear slowness higher than the borehole fluid slowness, the shear head waves are not measurable. Therefore, in slow formations, shear wave logging depends on borehole modes, such as dipole modes for wireline tools or quadrupole modes for logging-while-drilling (LWD) tools, to indirectly provide the formation shear slowness.

Unlike monopole head waves, the dipole or quadrupole borehole modes are dispersive. The characteristics of the dipole or quadrupole modes depend on formation shear slowness (DTs) as well as many other borehole-formation parameters, such as formation compressional slowness (DTc), formation density (ρb), mud slowness (DTm), mud density (ρm), and hole diameter (HD). Thus, to derive formation shear slowness (DTs) from the dipole or quadrupole modes, knowledge of these other borehole-formation parameters is provided.

A method for processing the dipole or quadrupole dispersive wave components to obtain the shear slowness is the dispersive slowness-time-coherence (DSTC) method disclosed in U.S. Pat. No. 5,278,805 issued to Kimball (assigned to the present assignee and incorporated herein by reference in its entirety). See also, Kimball, Geophysics, Vol. 63, No. 2, March-April 1998, pg. 337-344 and pg. 345-353. The DSTC method assumes most borehole-formation parameters, except DTs, are known. These borehole-formation parameters may be obtained from other logging operations or from the known dimensions of the borehole and the tool.

In general, the bandwidth for data telemetry for downhole tools may be limited, especially for Logging While Drilling (LWD) applications. As a result, most conventional sonic tools store received waveform data in memory downhole, and the data is retrieved and processed using surface computers. In such a case, the slowness data is only available after a job is complete. Even in wireline applications, the telemetry bandwidth is too limited to send all of the received waveform data to the surface to perform real time.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, a methodology and system are provided to introduce more robust techniques for slowness estimation (regardless of telemetry bandwidth), including techniques that can produce slowness of formation and/or fluid in accordance with dispersion information without user intervention. According to an embodiment, a technique is provided for processing dispersive waveform while drilling. In this embodiment, the technique utilizes a collar portion defining an axis and adapted for mounting in a drill string. The technique also may include use of at least a sonic transmitter mounted to the collar portion and a sonic receiver array mounted to the collar portion. The technique may further comprise employing a memory mounted within the collar portion and a processor, mounted within the collar portion, for converting dispersive waveforms into slowness of the formation and/or fluid in accordance with dispersion information stored in the memory. Additionally, the technique may utilize a telemetry system for sending the formation slowness data and/or quality control indicators to the surface. Other or alternative features will become apparent from the following description, from the drawings, and from the claims.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
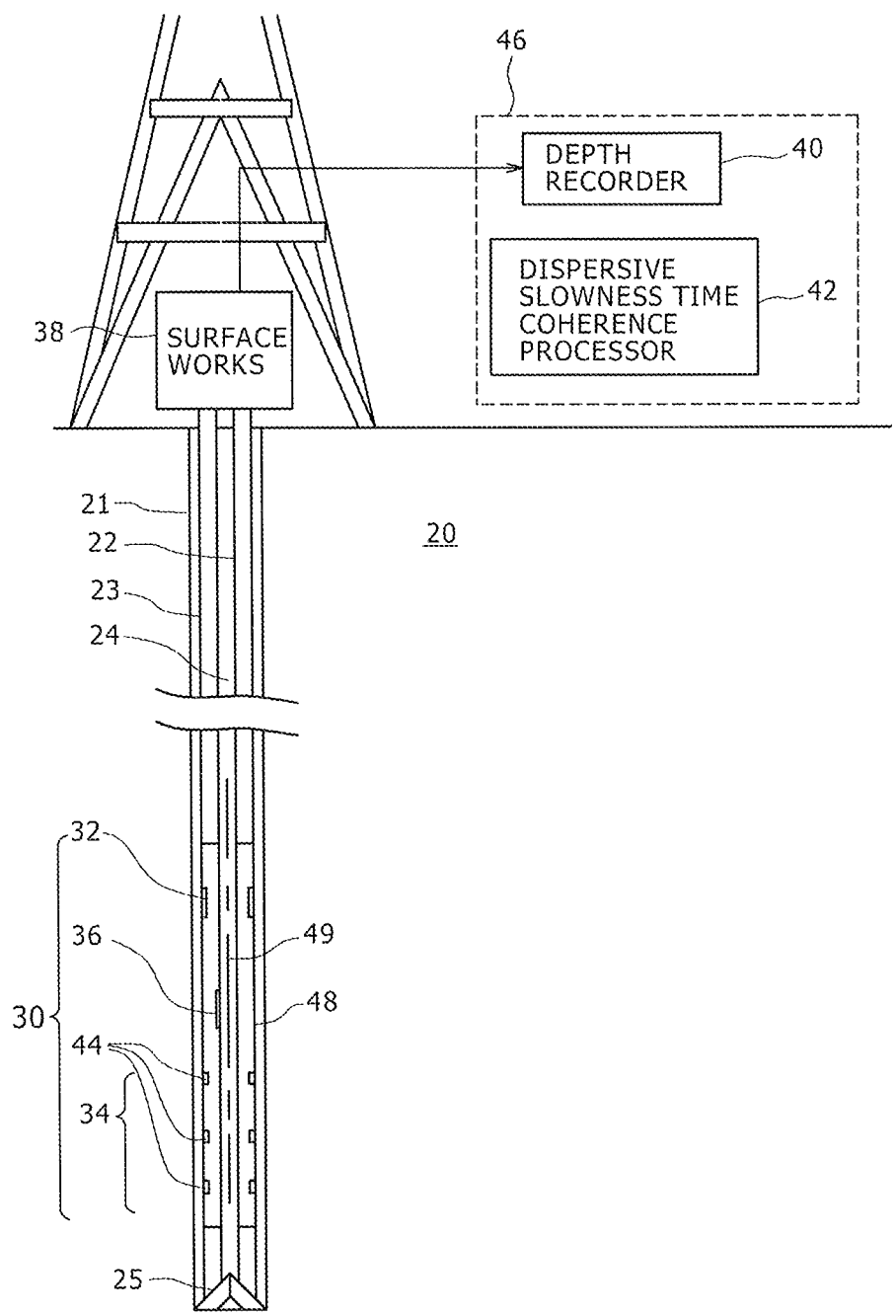
FIG. 1 is a schematic elevation view of an example of a system having a logging tool, e.g. an LWD multipole acoustic/sonic logging tool, located in a drill string or a wire line multipole acoustic/sonic logging tool (not shown), according to an embodiment of the disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Embodiments described herein provide a methodology and system related to more robust techniques for slowness estimation (regardless of telemetry bandwidth). The embodiments may include techniques that can produce slowness of formation and/or fluid in accordance with dispersion information without user intervention. For example, a system and methodology are provided for processing dispersive waveform while drilling. In this embodiment, the technique utilizes a collar portion defining an axis, and the collar portion is adapted for mounting in a drill string.

The technique may further include use of at least a sonic transmitter for outputting an acoustic signal and a sonic receiver array positioned in the borehole, e.g. mounted to the collar portion. In some applications, the technique may further comprise employing a memory mounted within the collar portion and a processor, e.g. a dispersive processor, mounted within the collar portion. The processor may be used for converting dispersive waveforms into slowness of the formation and/or fluid in accordance with dispersion information stored in the memory. Additionally, a telemetry system may be employed for sending the formation slowness data and/or quality control indicators to the surface.

According to an embodiment, a method is provided for generating a sonic log while drilling by processing sonic waveforms downhole through model based dispersive processing. The methodology may be applied to process various waveforms in a variety of applications, including processing quadrupole, leaky-P, dipole and other waveforms which may or may not have dispersive behavior.

Referring generally to FIG. 1, an embodiment of a well system is illustrated. Although a drill string well system is shown in this exemplary figure, a person of skill in the art will realize that this is only for the purpose of explanation. Embodiments of the current disclosure can be applied in a variety of applications and are not limited to drilling, such as LWD or WL for example.

In the example shown, an earth formation 20 has a borehole 21 which encloses a drill string 22. The drill string 22 has a string outer surface 23, a mud channel 24, and a drill bit 25. Additionally, a tool 30, e.g. a sonic logging while drilling tool, includes a sonic transmitter 32, e.g. an electro-acoustic multipole transmitter, a sonic receiver array 34, e.g. an electro-acoustic multipole receiver array, and receiver electronics 36. Surface equipment, e.g. a surface works 38, includes a drill string support and drive mechanism. Batteries or a mud motor in logging tool 30 may be used to provide electrical power to transmitter 32 and to the receiver electronics 36. The drill string 22 also may provide depth data to a depth recorder 40 which records depths during a given application. In an embodiment, depth recorder 40 and receiver electronics 36 each include a clock, and both depth and sonic signal data are recorded with time.

A dispersive slowness time coherence processor 42 may be used to perform dispersive slowness time coherence processing on digital data from the tool 30. The processor 42 may use recorded time data to associate depth data with signal data. The receiver array 34 may comprise a plurality of sonic signal receivers 44 disposed along the borehole 21, e.g. along the drill string 22. In some applications, the depth recorder 40 and the dispersive slowness time coherence processor 42 may be combined into an overall surface control system 46, such as a computer-based control system. In the illustrated embodiment, the sonic transmitter 32 and the sonic receiver array 34 are mounted to a collar portion 48 of the drill string 22. The collar portion 48 is disposed along, e.g. defines, an axis 49 extending longitudinally along the collar portion 48 and drill string 22. The collar portion 48 may comprise one or more drill collars joined together along the drill string 22.

In some embodiments, the sonic logging while drilling tool 30 is constructed with the ability to process non-dispersive and dispersive waveforms including the tool model. In this work flow example, the dispersive waveform also is processed downhole with the tool model information recorded in a flash device or other suitable memory 52 to generate the formation slowness log in real-time. With a suitably powerful processing unit, embedded software executes the algorithm so that various parameters may be decided based on the waveform data acquired downhole as well as predefined parameters (programmed prior to run-in-hole) to facilitate quicker processing of data.

The predefined parameters can be adjusted while drilling by sending a downlink command. By way of example, the downlink command may be transmitted downhole when the quality of data sent from downhole should be improved. Because there is no waveform data available on the surface computer 46 in the real-time case, a quality control indicator can be used to help judge the robustness of the dispersive processing results by using non-dispersive processing results or an algorithm to extract the dispersive-ness of the sonic waveform. For example, the quality control indicator may include an algorithm which identifies the presence of alteration and/or anisotropy, which may be inferred through model based slowness inversion processing.

Figure 2:
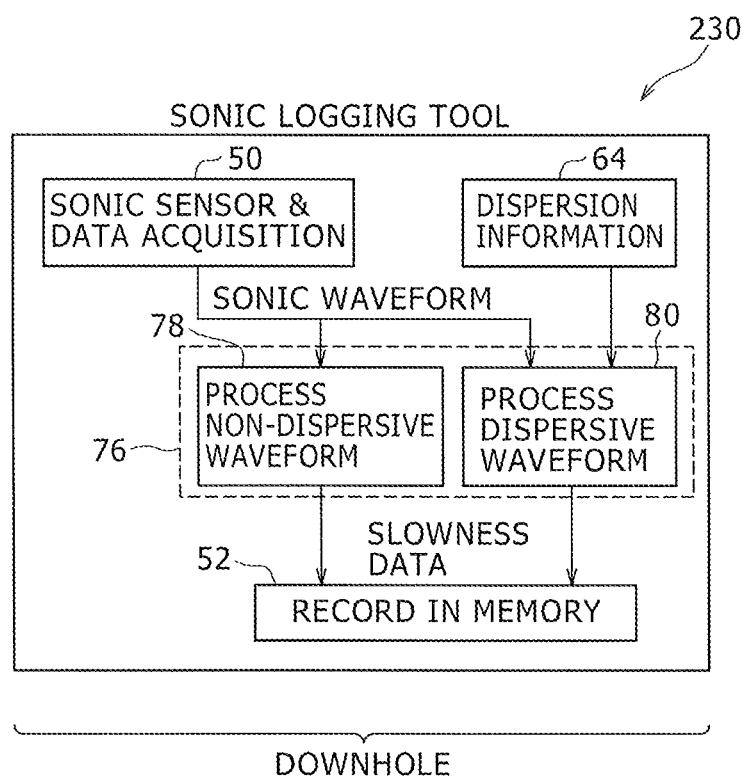
FIG. 2 is a flow diagram of dispersive and non-dispersive waveform processing for storing slowness data in a downhole memory in order to save on data storage for a downhole sonic logging tool, in accordance with an embodiment of the disclosure.

An example of a work flow in which non-dispersive waveform data and dispersive waveform data are processed and stored downhole is illustrated in the exemplary embodiment shown in FIG. 2. In this example, the sonic logging tool 230 is run downhole to acquire sonic waveform data via sonic sensor and data acquisition system 50 which may include receiver array 34 and receiver electronics 36 shown previously. As illustrated, the sonic waveform data is acquired downhole and the sonic waveform data may be used for downhole processing.

In this and other embodiments, the sonic waveform data may be processed by a downhole processor 76. The downhole processor 76 may be used to process non-dispersive waveform data, as represented by block 78, as well as dispersive waveform data, as represented by block 80. The processor 76 may be a single processor or a plurality of processors able to effectively provide a dispersive processing for converting dispersive waveforms into slowness of the formation and/or a non-dispersive processing for converting non-dispersive waveforms into slowness of the formation.

The dispersive waveform 80 may be processed according to a suitable tool model using dispersion information 64 recorded in the memory 52 of logging tool 230. In this embodiment and other embodiments described herein, the dispersion information 64 may comprise a set of model dispersion curves, such as a set of model dispersion curves retrieved from a pre-computed dispersion curve database. The dispersion information 64 may be stored in memory 52 or in another suitable memory. It should be noted that downhole processor 76, or other types of processing devices, may be combined with tool 230 or other components for processing of data downhole in various embodiments described herein.

The methodology comprises propagating multipole acoustic wave energy into the formation via sonic transmitter 32. The sonic receiver array 34 is used to detect multipole dispersive waveforms and to thus obtain data related to compressional and/or shear wave slowness of the formation 20. Additionally, tool mode information may be used in calculating formation compressional and/or shear wave slowness from the data obtained.

Depending on the application, various techniques may be used for calculating the formation compressional and/or shear slowness via, for example, downhole processor 76 and/or other suitable processors. By way of example, the calculating technique may comprise Fourier transforming at least a portion of the data, e.g. sonic signals, received by sonic receiver array 34 to obtain Fourier transformed signals. The Fourier transformed signals may then be back propagated utilizing a plurality of multipole dispersion curves to obtain sets of back propagated signals/data. The back propagated signals of each set may then be stacked to provide a plurality of stacked sets. These stacked sets may then be used to determine formation compressional and/or shear wave slowness.

The processed data, e.g. formation slowness data and quality control indicators, may be stored in memory 52 until retrieval of the sonic logging tool 230. In other applications, embodiments of the disclosure may have processed data sent to the surface via a variety of known techniques.

Figure 3:
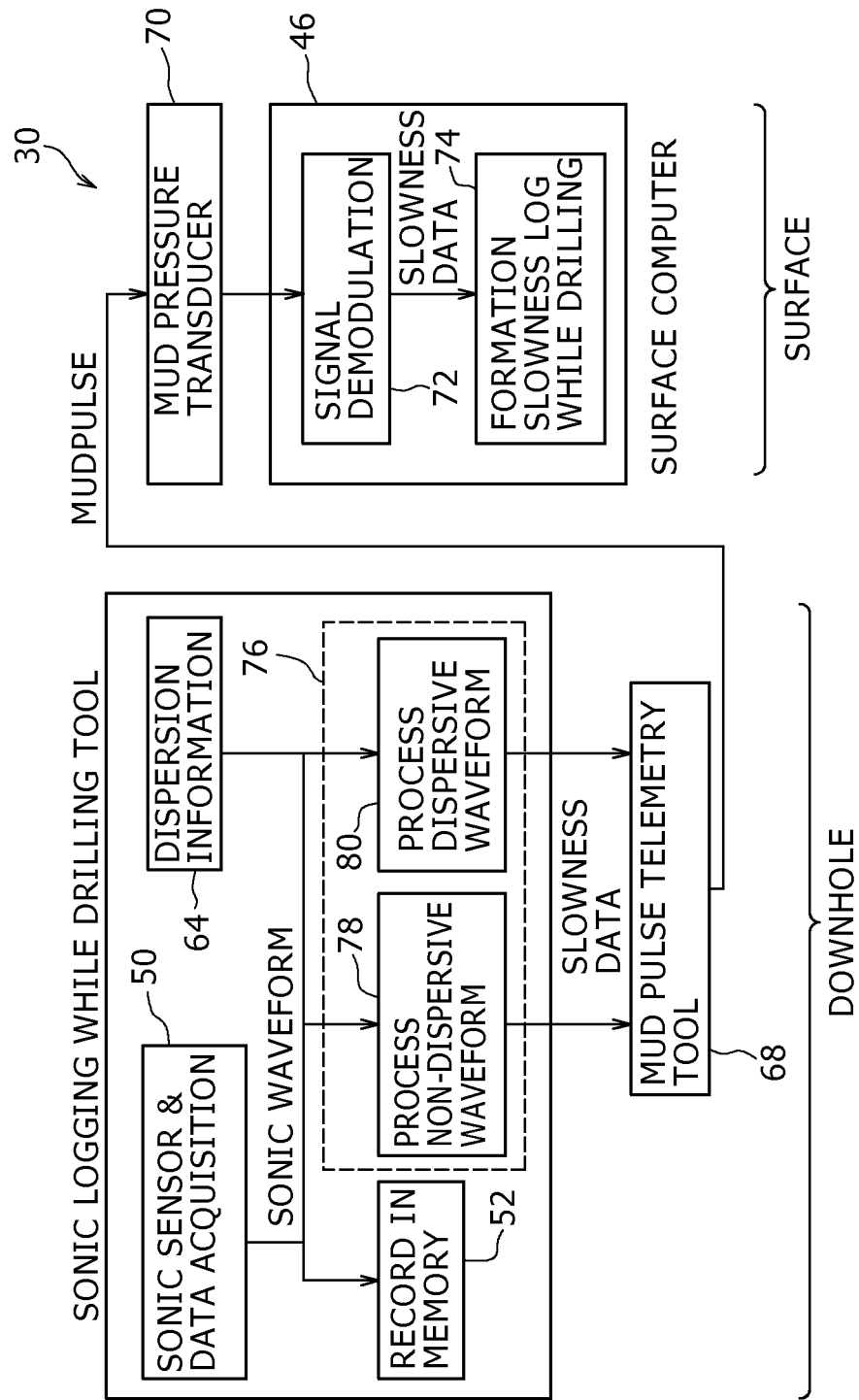
FIG. 3 is a flow diagram of dispersive and non-dispersive waveform processing for a downhole sonic logging tool used while drilling, in accordance with an embodiment of the disclosure.

An example of a work flow in which non-dispersive waveform data and dispersive waveform data are processed downhole is illustrated in exemplary FIG. 3. In this example, the sonic logging while drilling tool 30 is run downhole to acquire sonic waveform data via sonic sensor and data acquisition system 50 which may include receiver array 34 and receiver electronics 36. As illustrated, the sonic waveform data is acquired downhole while drilling, and the sonic waveform data may be used for downhole processing.

At least portions of the data also may be sent to downhole memory device 52. In this and other embodiments, a downhole processor 76 may be used to process non-dispersive waveform data, as represented by block 78, as well as dispersive waveform data, as represented by block 80. The processor 76 may be a single processor or a plurality of processors able to effectively provide a dispersive processing for converting dispersive waveforms into slowness of the formation and/or a non-dispersive processing for converting non-dispersive waveforms into slowness of the formation. According to an embodiment, the downhole processor 76 may be mounted within collar portion 48.

The dispersive waveform 80 may be processed according to a suitable tool model using dispersion information 64 recorded in the memory 52 of logging tool 30. In this embodiment and other embodiments described herein, the dispersion information 64 may comprise a set of model dispersion curves, such as a set of model dispersion curves retrieved from a pre-computed dispersion curve database. The dispersion information 64 may be stored in memory 52 or in another suitable memory. It should be noted that downhole processor 76, or other types of processing devices, may be combined with tool 30 or other components of drill string 22 for processing of data downhole in various embodiments described herein.

According to an operational example, drill string 22 is provided with sonic logging tool 30 and deployed into borehole 21. Borehole 21 is drilled into formation 20 and contains fluid, e.g. well fluid. The methodology comprises propagating multipole acoustic wave energy into the formation via sonic transmitter 32. The sonic receiver array 34 is used to detect multipole dispersive waveforms and to thus obtain data related to compressional and/or shear wave slowness of the formation 20. Additionally, tool mode information may be used in calculating formation compressional and/or shear wave slowness from the data obtained. The processed data on formation compressional and/or shear wave slowness may then be sent to the surface.

Depending on the application, various techniques may be used for calculating the formation compressional and/or shear slowness via, for example, downhole processor 76 and/or other suitable processors. By way of example, the calculating technique may comprise Fourier transforming at least a portion of the data, e.g. sonic signals, received by sonic receiver array 34 to obtain Fourier transformed signals. The Fourier transformed signals may then be back propagated utilizing a plurality of multipole dispersion curves to obtain sets of back propagated signals/data. The back propagated signals of each set may then be stacked to provide a plurality of stacked sets. These stacked sets may then be used to determine formation compressional and/or shear wave slowness and this data may be sent to the surface.

The processed data, e.g. formation slowness data and quality control indicators, may be sent to the surface via the telemetry tool 68, e.g. a mud pulse telemetry tool, and received at the surface via the receiver 70, e.g. a mud pressure transducer. In some applications, the data may then undergo signal demodulation, as again represented by graphical block 72. For example, the surface computer 46 may be used to process the data and to modulate the signals acquired downhole to extract slowness data related to formation 20. The processed data may then be used to establish the appropriate while drilling formation slowness log 74. In this example, the log of formation slowness 74 is generated at the surface in real-time while drilling and may include quality control indicators.

Figure 4:
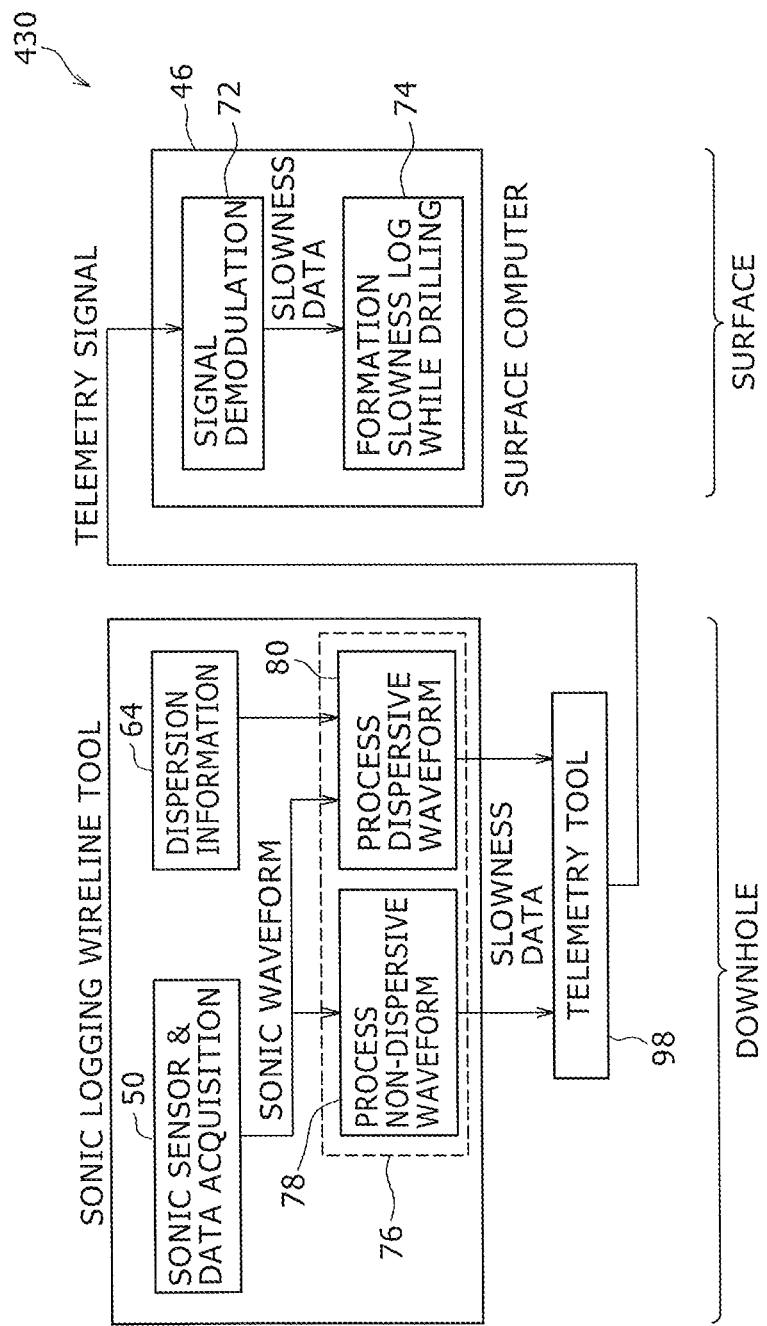
FIG. 4 is a flow diagram of dispersive and non-dispersive waveform processing for a downhole wireline sonic logging tool, in accordance with another embodiment of the disclosure.

An example of a work flow in which non-dispersive waveform data and dispersive waveform data are processed downhole is illustrated in exemplary FIG. 4. In this example, the sonic logging wireline tool 430 is run downhole to acquire sonic waveform data via sonic sensor and data acquisition system 50 which may include receiver array 34 and receiver electronics 36. As illustrated, the sonic waveform data is acquired downhole via a sonic wireline logging tool, and the sonic waveform data may be used for downhole processing.

At least portions of the data also may be sent to downhole memory device 52. In this and other embodiments, a downhole processor 76 may be used to process non-dispersive waveform data, as represented by block 78, as well as dispersive waveform data, as represented by block 80. The processor 76 may be a single processor or a plurality of processors able to effectively provide a dispersive processing for converting dispersive waveforms into slowness of the formation and/or a non-dispersive processing for converting non-dispersive waveforms into slowness of the formation. According to an embodiment, the downhole processor 76 may be mounted within collar portion 48.

The dispersive waveform 80 may be processed according to a suitable tool model using dispersion information 64 recorded in the memory 52 of sonic logging wireline tool 430. In this embodiment and other embodiments described herein, the dispersion information 64 may comprise a set of model dispersion curves, such as a set of model dispersion curves retrieved from a pre-computed dispersion curve database. The dispersion information 64 may be stored in memory 52 or in another suitable memory. It should be noted that downhole processor 76, or other types of processing devices, may be combined with sonic logging wireline tool 430 or other components of a wireline tool string (not shown) for processing of data downhole in various embodiments described herein.

Depending on the application, various techniques may be used for calculating the formation compressional and/or shear slowness via, for example, downhole processor 76 and/or other suitable processors. By way of example, the calculating technique may comprise Fourier transforming at least a portion of the data, e.g. sonic signals, received by sonic receiver array 34 to obtain Fourier transformed signals. The Fourier transformed signals may then be back propagated utilizing a plurality of multipole dispersion curves to obtain sets of back propagated signals/data. The back propagated signals of each set may then be stacked to provide a plurality of stacked sets. These stacked sets may then be used to determine formation compressional and/or shear wave slowness and this data may be sent to the surface.

The processed data, e.g. formation slowness data and quality control indicators, may be sent to the surface via the telemetry tool 98, e.g. an electromagnetic, electronic, sonic or optical telemetry tool, and received at the surface via a surface computer 46, including e.g. a surface modem, demodulator, and processor, among others. In some applications, the data may then undergo signal demodulation, as again represented by graphical block 72. For example, the surface computer 46 may be used to process the data and to modulate the signals acquired downhole to extract slowness data related to formation 20.

Figure 5:
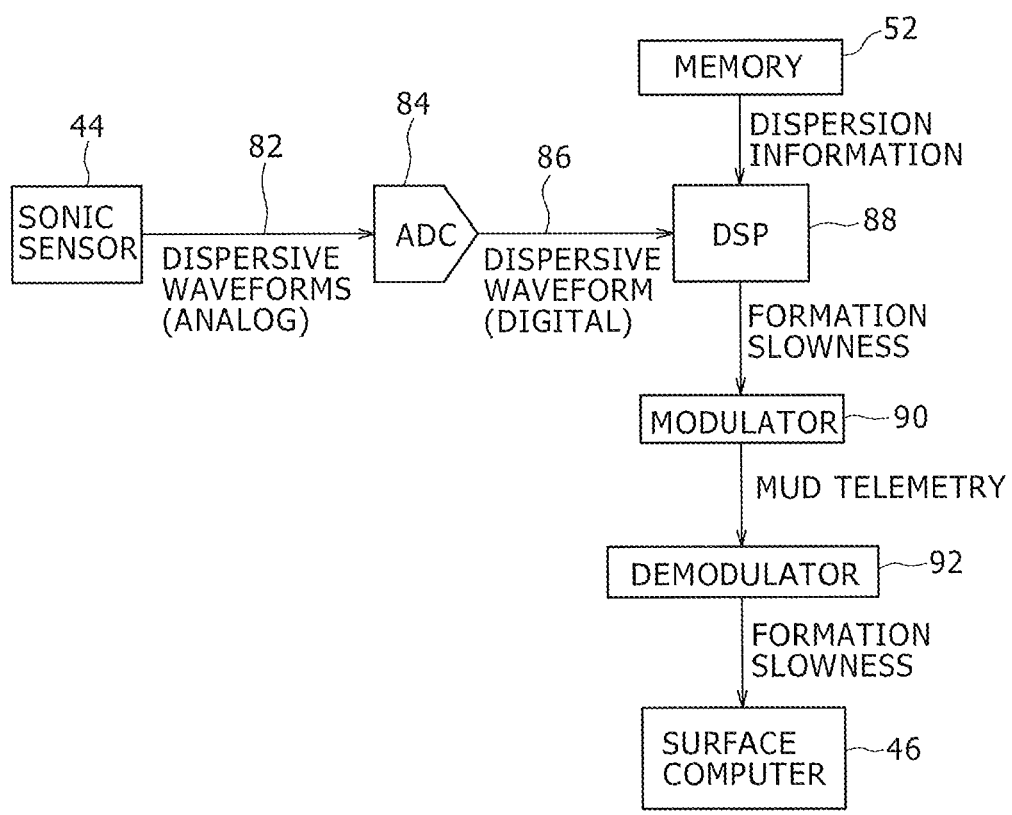
FIG. 5 is a flow diagram representing an example of a tool for dispersive waveform processing while drilling, in accordance with another embodiment of the disclosure.

Referring generally to FIG. 5, another operational example is provided according to the illustrated work flow. In this exemplary embodiment, a sonic sensor, e.g. receiver 44, is disposed on sonic logging tool 30 to receive sonic signals and to generate dispersive waveform data 82 in analog form. The dispersive waveform 82 is transformed into digital form by an analog to digital converter (ADC) 84. Then, the resulting digital dispersive waveform data 86 is input into a digital signal processor 88 (which may be part of processing unit 76) for computing formation slowness. Dispersion information may be stored in a suitable memory device, e.g. memory device 52, and the stored data may be processed to enable utilization of information related to tool model.

Next, the formation slowness data is modulated into a modulated data, as represented by processing module 90. The modulated data is then sent up hole via telemetry tool 68 which may be in the form of a mud pulse telemetry tool. Subsequently, the modulated data may be demodulated into a demodulated data for formation slowness, as represented by processing module 92. In some applications, the data may be demodulated at the surface by, for example, surface controller 46. In this example, the log data can be provided and processed in real-time while drilling.

Figure 6:
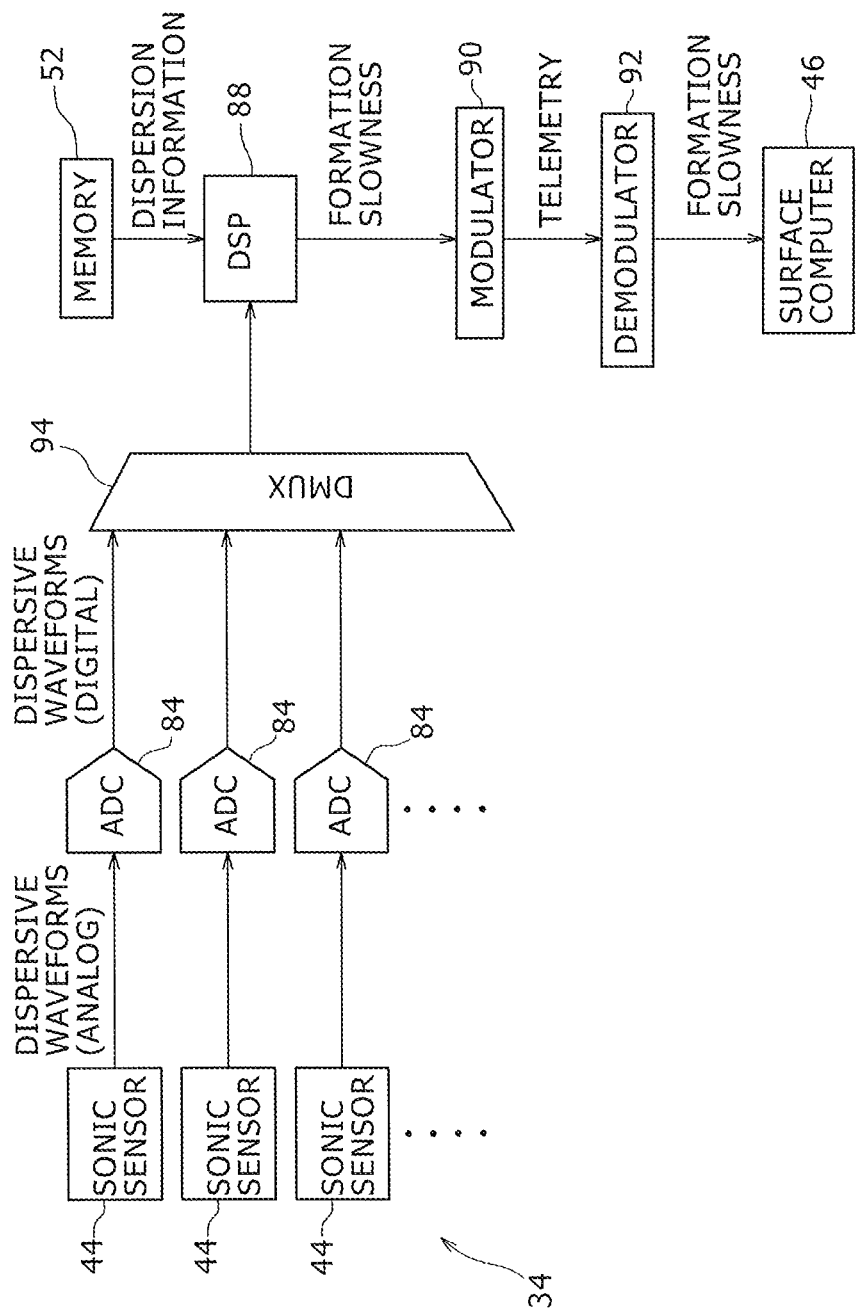
FIG. 6 is a flow diagram representing another example of a tool for dispersive waveform processing while drilling, according to an embodiment of the disclosure.

Referring generally to FIG. 6, another operational example is provided according to the illustrated work flow. In this embodiment, several sonic sensors, e.g. receivers 44, are disposed on sonic logging tool 30 to receive sonic signals and to generate dispersive waveforms 82 in analog form. The dispersive waveforms 82 are transformed into digital form by analog to digital converters 84. Then, the resulting digital dispersive waveforms 86 are input into a digital multiplexer 94 (which may be part of processing unit 76) for computing formation shear slowness. Dispersion information may be stored in a suitable memory device, e.g. memory device 52, and the stored data may be processed to enable utilization of information related to tool mode. In some applications, the look up table may be used to store model dispersion curves.

As with the previous embodiment, the formation slowness data may be modulated into a modulated data, as represented by processing module 90. The modulated data is then sent up hole via telemetry tool 68 which may be in the form of a mud pulse telemetry tool. Subsequently, the modulated data may be demodulated into a demodulated data for formation slowness, as represented by processing module 92. In some applications, the data may be demodulated at the surface by, for example, surface controller 46. In this example, the log data also can be provided and processed in real-time while drilling.

Depending on the application, various types of drill strings 22 and logging tools 30 may be used in the overall system. Similarly, various types of downhole processors and/or surface processors may be utilized to process the acquired acoustic data. The data processing techniques, e.g. algorithms, used to process the data also may be selected and/or adjusted according to the parameters of a given application and/or environment. The number of sonic sources and receivers in the sonic LWD tool 30 also may vary according to the application. Additionally, the data sent to surface may include various types of quality control indicators, such as alteration and/or anisotropy indicators.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for processing waveforms, comprising:
   an apparatus to process dispersive waveforms of a formation surrounding a borehole containing a fluid, the apparatus comprising:
   a sonic logging tool deployed in the borehole, the sonic logging tool further comprising;
   a sonic transmitter;
   a sonic receiver array;
   a memory; and
   a processor located downhole for downhole processing of dispersive waveforms to convert the dispersive waveforms into formation slowness or fluid slowness in accordance with dispersion information stored in the memory;
   a telemetry tool in communication with the processor to receive processed data from the processor and to send the processed data to the surface; and
   a surface computer which receives the processed data and converts the processed data into a log of slowness data.

2. The system as recited in claim 1, wherein the dispersion information comprises a set of model dispersion curves.

3. The system as recited in claim 2, wherein the set of model dispersion curves is retrieved from a pre-computed dispersion curve database or calculated from tool model information.

4. The system as recited in claim 1, wherein the processor converts dispersive waveforms into formation slowness and further comprising a surface computer for generating a log of the formation slowness at the surface computer in real-time.

5. The system as recited in claim 1, wherein a quality control indicator is calculated along with the formation slowness or the fluid slowness.

6. The system as recited in claim 5, wherein the quality control indicator comprises an alteration and/or anisotropy indicator.

7. The system as recited in claim 5, wherein the quality control indicator is sent to the surface by telemetry with the formation slowness or fluid slowness data.

8. The system as recited in claim 5, wherein the quality control indicator is stored in a downhole memory.

9. The system as recited in claim 1, wherein the logging tool comprises a LWD tool with a telemetry tool.

10. The system as recited in claim 1, wherein the logging tool comprises a wireline tool and the telemetry comprises a wireline telemetry.

11. The system as recited in claim 1, further comprising multiple receiver array are located azimuthally and the transmitter is multipole transmitter.

12. A method, comprising:
    deploying a sonic logging tool into a borehole drilled into a formation and containing a fluid;
    propagating multipole wave energy into the formation;
    detecting multipole waveforms to obtain data of slowness of the formation and/or the fluid;
    providing predefined parameters to a downhole memory device;
    processing the predefined parameters and the data of slowness of the formation and/or fluid downhole to calculate formation slowness or fluid slowness using dispersion information;
    sending processed data to a surface computer; and
    using the surface computer to output information on the processed data regarding evaluation of the formation.

13. The method as recited in claim 12, wherein propagating comprises using sonic transmitters mounted to the logging tool.

14. The method as recited in claim 12, wherein detecting comprises detecting with a sonic receiver array mounted to the logging tool.

15. The method as recited in claim 12, wherein providing comprises storing tool model information in the downhole memory device.

16. A method, comprising:
    deploying a sonic logging tool into a borehole drilled into a formation and containing a fluid;
    propagating multipole wave energy into the formation;
    detecting multipole waveforms to obtain data of slowness of the formation and/or the fluid;
    calculating at a downhole location formation slowness and fluid slowness from the data using dispersion information to obtain processed data at the downhole location; and
    using a telemetry system to send the processed data to a surface processing system for additional processing so as to output data on the formation.

17. The system as recited in claim 1, wherein the dispersion information comprises a set of model dispersion curves retrieved from a pre-computed dispersion curve database or calculated from tool model information.

* * * * *